INVENTORS.
CARL F. BUHRER
VERNON J. FOWLER

BY R. J. Frank

ATTORNEY

INVENTORS.
CARL F. BUHRER
VERNON J. FOWLER
ATTORNEY.

United States Patent Office 3,357,771
Patented Dec. 12, 1967

3,357,771
LIGHT BEAM DEFLECTOR EMPLOYING ELECTRO-OPTIC CRYSTAL
Carl F. Buhrer, Hempstead, and Vernon J. Fowler, East Meadow, N.Y., assignors to General Telephone and Electronics Laboratories, Inc., a corporation of Delaware
Filed Oct. 1, 1963, Ser. No. 313,041
11 Claims. (Cl. 350—160)

ABSTRACT OF THE DISCLOSURE

Apparatus for deflecting a light beam through a predetermined angle consisting of an electro-optic crystal having hyberbolically shaped electrodes arranged symmetrically about the crystal. An electric field applied to the electrodes produces a linear variation in the refractive index of the crystal. A light beam propagated through the crystal in a direction normal to the linear variation is deflected through an angle determined by the change in refractive index.

---

This invention relates to apparatus for deflecting a beam of electromagnetic energy and more particularly to a device for electrically controlling the direction of propagation of a light beam.

Various methods have been used in the past to change the direction of propagation of a light beam. In one method, variable reflectors in the form of rotating mirrors driven by electric motors provide the desired deflection. Alternatively, variable reflection systems have employed vibrating mirrors actuated by electrodynamic or piezoelectric driving circuits. In another known method, deflection is accomplished by passing the light beam through a transparent material, such as a glass or quartz bar, in which intense sound waves have been set up. The sound waves cause the material to act as a diffraction grating, the deflection of the beam being controlled by the frequency of the waves. The principal disadvantage of devices employing variable reflection or variable diffraction techniques to deflect a light beam is that the speed of response is limited. Hence, they are not suitable for use in many applications, such as scanned displays for radar and television systems.

Accordingly, it is an object of our invention to provide improved apparatus for deflecting a light beam.

Another object is to provide an electrically controlled light beam deflecting apparatus which has a higher speed of response than known deflecting systems.

Still another object is to provide light beam deflecting apparatus in which the absorption of beam energy is minimized and in which the collimation of the incident beam is substantially retained as the beam is deflected.

A further object is to provide apparatus for deflecting a plane polarized light beam symmetrically about the axis of light propagation.

Yet another object is to provide light beam deflecting apparatus having a large number of distinguishable beam positions within the beam deflecting angle.

In the present invention, a beam of electromagnetic energy is passed through an element composed of an electrically controllable refractive medium. An electric or magnetic field applied across the element induces a nonuniform change in the refractive index of the medium and, as a result, the beam which emerges from the element is deflected through an angle determined by the change in the refractive index.

In one embodiment of the invention, the refractive index of the medium varies linearly in a direction transverse to the initial direction of the beam. The phase velocity of each part of the beam as it passes through the medium is determined by the refractive index of the portion of the medium being traversed and therefore, by varying the refractive index as described above, the angle of refraction can be controlled. The total angle through which the beam may be deflected in a given medium is a function of the change in the refractive index across the cross-section of the incident beam.

Our device is particularly useful in communication and navigation systems employing light beams having angular widths of the order of seconds of arc. By light is meant electro-magnetic radiation having wavelengths falling within the range $10^{-1}$ to $10^4$ microns. In one type of light beam deflecting system, the medium through which the beam is propagated is an electro-optic crystal; that is, a crystal in which the refractive index is varied by an electric field. The crystal is positioned within an electric field which produces a linear variation in the refractive index of the crystal in a direction transverse to the direction of propagation of the beam. When a beam of light which has been plane polarized is transmitted through the crystal, the beam is deflected through an angle determined by the change in the refractive index.

In one embodiment of a light beam deflecting system employing an electro-optic crystal, the crystal is composed of potassium dihydrogen phosphate ($KH_2PO_4$) and the electric field is generated by hyperbolically shaped electrodes arranged symmetrically about the crystal. Plane polarized light is propagated through the crystal in the $[1\bar{1}0]$ direction with its plane of polarization in the [110] direction. As shall be shown hereinafter, the electrodes are so shaped and positioned with respect to the crystal that the required linear variation in the refractive index with distance occurs in the [110] direction.

Magneto-optic materials may be used in place of electro-optic materials. With these materials the linear variation in the refractive index is obtained by a magnetic field of the necessary magnitude and direction.

The above objects of and the brief introduction to the present invention will be more fully understood and further objects and advantages will become apparent from a study of the following description in connection with the drawings, wherein.

Figure 1:
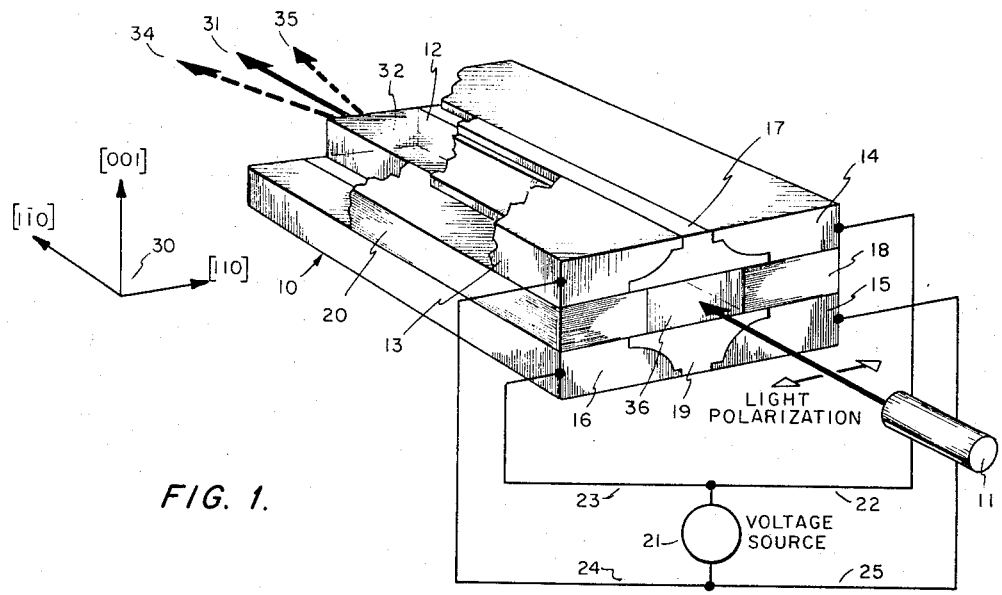
FIG. 1 is a perspective cutaway view of our light beam deflecting device.

In FIG. 1 there is shown a partially cutaway perspective view of the light beam deflector 10 arranged to deflect a plane polarized beam emitted by a light source 11. The beam deflector comprises an anisotropic electro-optic crystal 12 formed, for example, of potassium dihydrogen phosphate (KDP), metallic electrodes 13, 14, 15 and 16 having hyperbolic cross-sections and isotropic filler dielectric members 17, 18, 19 and 20 for spacing the electrodes and crystal. The electrodes 13–16 may be made, for example, of brass and the filler dielectrics of epoxy resin. One terminal of a source of voltage 21 having a variable output is connected by leads 22 and 23 to electrodes 14 and 16, respectively, and the other terminal connected by leads 24 and 25 to electrodes 13 and 15, respectively.

Light source 11 is preperably one which can produce a well collimated beam of plane polarized light such as an optical maser. A gaseous optical master suitable for this application is described in detail in U.S. Patent 3,-183,937 granted May 18, 1965 to Kenneth D. Earley, Thomas G. Polanyi and William Watson.

As indicated by the directional axes 30 adjacent FIG. 1, the electro-optic crystal 12 and light source 11 are oriented so that the beam of plane polarized light is propagated in the [1$\bar{1}$0] direction and plane polarized in the [1$\bar{1}$0] direction. The optic axis [001] of the crystal is vertical and orthogonal to both the [1$\bar{1}$0] and [110] directions. If the voltage output of source 21 is zero, the refractive index for light polarized along the [110] axis in crystal 12 is constant and therefore the entire beam is propagated through the crystal at the same velocity. Consequently, the beam 31 emerging at the far end 32 of crystal 12 is undeflected.

When the output of voltage source 21 is increased from zero, a voltage difference is produced between electrodes 13, 15 (which are at first common potential) and electrodes 14, 16 (which are at a second common potential). The resulting electric field produces a linear variation in the refractive index of crystal 12 in the [110] direction. This is shown in the end view of FIG. 2 in which the relative refractive index along the [110] direction is indicated by the dashed line 33. Thus, different portions of the collimated beam of plane polarized light (as represented by the line segment AB) are propagated through crystal 12 at different velocities. For example, the edge of the beam impinging on the crystal at point A passes through a portion of the crystal having a relatively high refractive index and therefore its velocity is lower than that part of the beam striking the crystal at point B where the refractive index has a smaller magnitude. The portion of the beam in the center is unchanged by the field because the field at that point is always zero. Since the velocity of the beam varies linearly across the width of crystal 12 the surfaces of constant phase tilt as the beam passes down the crystal. When the beam emerges from the crystal at the far end 32 and enters the optically isotropic medium beyond, the ray direction becomes perpendicular to the surfaces of constant phase and the light beam is deflected. The deflection of the beam to the left and right is indicated in FIG. 1 by the dashed lines 34 and 35, respectively.

Figure 2:
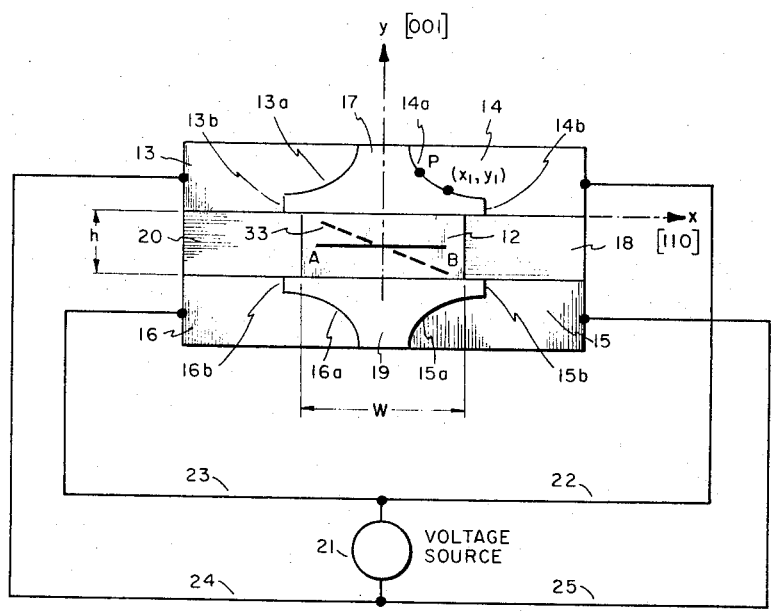
FIG. 2 is an end view of the device showing the variation in the refractive index with voltage.
Figure 3:
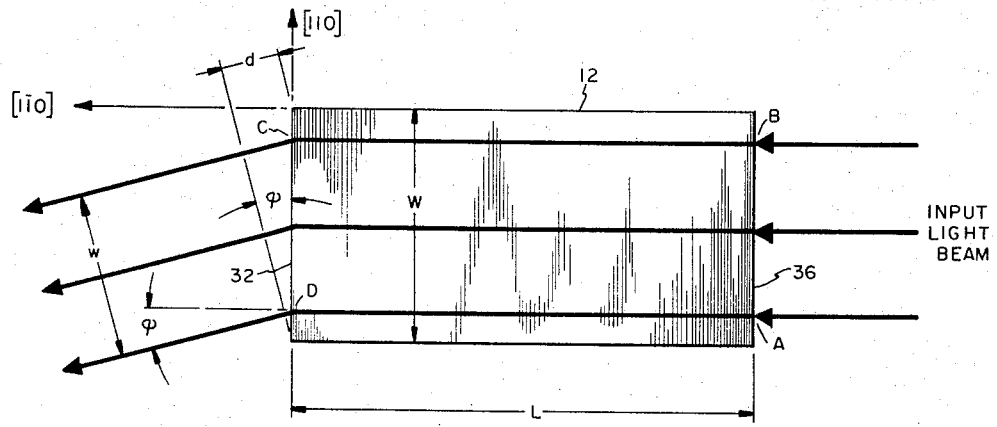
FIG. 3 is a schematic plan view of the electro-optic crystal useful in explaining the manner in which deflection is obtained.

FIG. 3 is a plan view of crystal 12 with the electrodes and dielectric filler elements removed for clarity. The light beam is shown entering the crystal 12 at end 36, passing through the crystal, and being deflected through the angle $\varphi$ at end 32. As discussed in connection with FIG. 2, light entering the crystal at point A passes through a medium having a higher refractive index than the entering at point B and therefore its velocity through the crystal is lower than that entering at point B. As a result, the entire beam is refracted and there is a gradual tilt in the phase front of the beam as it passes down the crystal.

The angle of tilt $\varphi$ is a function of the change in the refractive index $\Delta n$ of the crystal between the edges A and B of the beam, the length L and the width W of the crystal. This can be seen by equating the phase difference $2\pi L \Delta n / \lambda_0$ between light emerging from the crystal at points C and D with the equivalent phase shift $2\pi d / \lambda_0$ in air, where $\lambda_0$ is the free-space wave-length of the incident light and $d$ is the distance between the phase plane of the emerging refracted beam and the end 32 of the crystal. Thus, $d = L \Delta n$ and, from FIG. 3, $$\sin \varphi = \frac{d}{W} \cong \varphi$$

since $\varphi$ is a small angle on the order of one degree. Consequently, $$\varphi = \frac{L}{W} \Delta n$$

as stated.

Using a well-collimated parallel light beam, such as can be obtained from optical maser 11, a cone of light can be produced having a theoretical minimum "beam angle" which is limited by diffraction to $$\theta = \lambda_0 / w$$

where $\theta$ is the angle formed by the intercepts of the cone on a plane containing the cone axis and $w$ is the width of the light beam as it emerges from the beam deflector.

The number of distinguishable beam directions N contained within the beam deflection angle is then $\varphi / \theta_0$ and is equal approximately to $$\Delta n \left( \frac{L}{\lambda_0} \right) \left( \frac{w}{W} \right)$$

At room temperature, values of $\Delta n$ somewhat larger than $2 \times 10^{-4}$ can be produced in KDP, L can be about one foot and $w$ made approximately equal to W. Thus, for a visible gas laser light beam at $\lambda_0 = 0.6328 \times 10^{-4}$ cm., N is approximately equal to 100.

Returning now to FIG. 2, the cross-sections 13a, 14a, 15a and 16a of electrodes 13–16 and the relationship between these electrodes must be such that there is a linear change in the refractive index of crystal 12 in the [110] direction. If the $x$ axis is taken in the [110] direction along a line separating dielectric member 17 from crystal 12 and the $y$ axis is taken in the [001] direction through the center of crystal 12, it can be shown that the distance $y$ between any point P on the curved cross-section 14a of electrode 14 and the $x$ axis is $$y = -\frac{h \epsilon_2}{2 \epsilon_1} + \frac{X_2}{x} \left( Y_1 + \frac{h \epsilon_2}{2 \epsilon_1} \right)$$

where $h$ is the height of crystal 12, $\epsilon_2$ is the dielectric constant of the isotropic filler members 17–20, $\epsilon_1$ is the dielectric constant of the anisotropic electro-optic crystal 12 along the [001] or $y$ direction, $X_1$ and $Y_1$ are the distances from the $x$ and $y$ axis respectively of a point selected to be on the curve 14a, and $x$ is the distance between any point P on the curve and the $y$ axis. Each of the other electrodes 13, 15 and 16 have the same shape as electrode 14 and are symmetrically disposed about the center of crystal 12. For convenience in fabrication, the hyperbolic cross-sections of electrodes 13–16 are terminated at 13b–16b, the effect on the electric field across crystal 12 being negligible.

Figure 4:
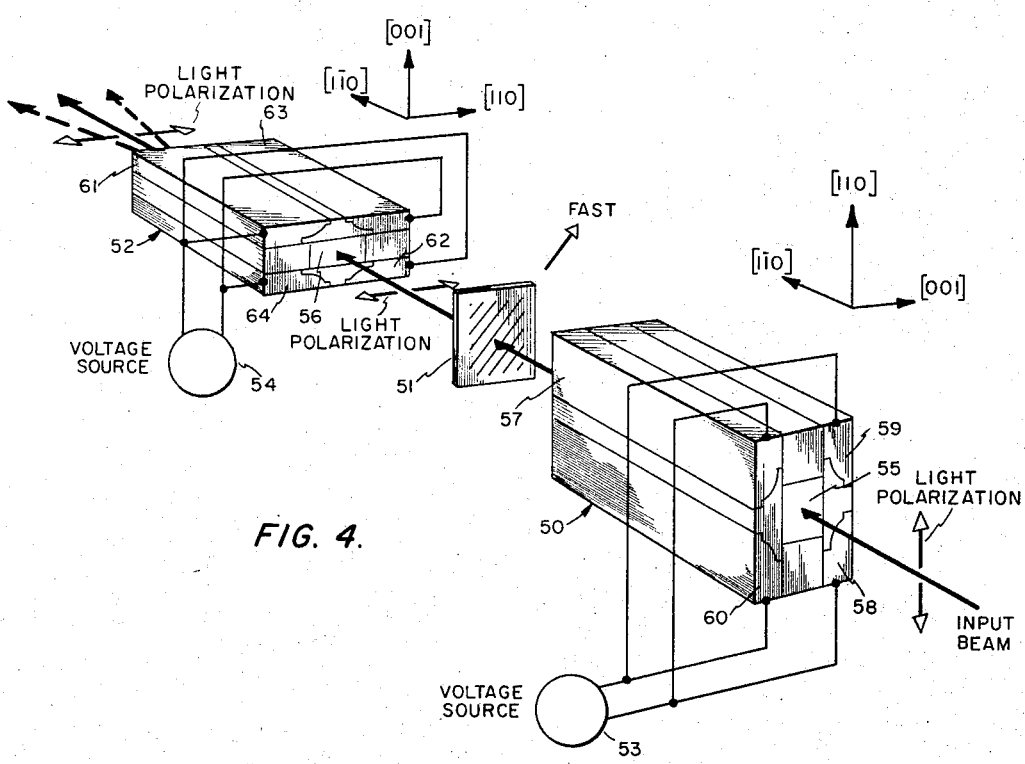
FIG. 4 shows how the invention may be used to obtain light beam deflection in two dimensions.

FIG. 4 depicts schematically a two-dimensional electro-optic scanner in which polarized light is passed through two beam deflectors of the type shown in FIGS. 1–3 and through a polarization converter interposed between the two deflectors. As shown in FIG. 4, vertically polarized light impinges on a vertical deflector 50, passes through a half-wave plate 51 and then through a horizontal deflector 52. The beam which emerges from deflector 52 can be deflected in the vertical direction by applying a voltage to deflector 50 from source 53 and in the horizontal direction by applying a voltage to deflector 52 from source 54. Thus, the output beam may be steered in two dimensions.

Deflectors 50 and 52 comprise KDP electro-optic crystals 55 and 56 respectively. Both crystals have their [1$\bar{1}$0] axis oriented in the direction of light propagation and their [001] axis at right angles to each other. The [110] axes of these crystals, along which the linear change in refractive index occurs, are also at right angles. Electrodes 57 and 58 are connected to one terminal of voltage source 53 and electrodes 59 and 60 are connected to the other terminal. Similarly, electrodes 61 and 62 are connected to one terminal of voltage source 54 and electrodes 63 and 64 to the other terminal.

Polarization converter 51 changes the vertically polarized light leaving vertical deflector 50 to horizontally polarized light, the light emerging from converter 51 being polarized along the [110] axis of crystal 52. The fast axis of half wave plate 51 is at 45° to the vertical and horizontal direction and therefore there is a 90° displacement between the plane of polarization of the incident beam and the beam emerging from the plate 51.

As many changes could be made in the above construction and many different embodiments could be made without departing from the scope thereof, it is intended

What is claimed is:

1. Apparatus for deflecting a beam of electromagnetic energy comprising
   (a) an element composed of an electrically controllable refractive medium positioned in the path of said beam, the refractive index of said element being non-uniform in the presence of an applied field, and
   (b) means for producing a linear variation in the refractive index of said crystal comprising field generating means positioned adjacent said element, said field generating means producing said linear variation in the refractive index of said element in a direction transverse to the direction of propagation of said beam, the beam emerging from said element being deflected from said direction of propagation through an angle determined by the change in said refractive index.

2. Apparatus for deflecting a beam of electromagnetic energy comprising
   (a) an electro-optic element comprised of an electrically controllable refractive medium positioned in the path of said beam, the refractive index of said element being non-uniform in the presence of an applied electric field,
   (b) means for producing a linear variation in the refractive index of said crystal comprising electric field generating means positioned adjacent said electro-optic element, said electric field generating means producing said linear variation in the refractive index of said electro-optic element in a direction transverse to the direction of propagation of said beam, the beam emerging from said electro-optic element being deflected from said direction of propagation through an angle determined by the change in said refractive index.

3. Apparatus for deflecting a beam of light comprising
   (a) an electro-optic element composed of an electrically controllable refractive medium positioned in the path of said beam, the refractive index of said element being non-uniform in the presence of an applied electric field, and
   (b) means for producing a linear variation in the refractive index of said crystal comprising a plurality of electrodes spaced about said element and extending along said element in the direction of propagation of said beam, said electrodes being spaced to produce in response to an applied voltage said linear variation in the refractive index of said element in a direction transverse to the direction of propagation of said beam, the beam emerging from said element being deflected from said direction of propagation through an angle determined by the change in said refractive index.

4. Apparatus for deflecting a beam of light comprising
   (a) an electro-optic crystal positioned in the path of said beam, the refractive index of said crystal being uniform in the absence of an electric field and non-uniform in the presence of an electric field, and
   (b) means for producing a linear variation in the refractive index of said crystal comprising first, second, third and fourth electrodes spaced about said crystal and extending along said crystal in the direction of propagation of said beam, the surfaces of said electrodes adjacent said crystal being substantially hyperbolic in shape, and
   (c) means for applying a signal voltage between said electrodes, the electric field produced thereby resulting in said linear variation in the refractive index of said crystal in a direction transverse to the direction of propagation of said beam, the beam emerging from said crystal being deflected from said direction of propagation through an angle determined by the change in said refractive index.

5. Apparatus for deflecting a beam of light comprising
   (a) an electro-optic crystal positioned in the path of said beam, the refractive index of said crystal being uniform in the absence of an electric field and non-uniform in the presence of an electric field,
   (b) means for producing a linear variation in the refractive index of said crystal comprising first, second, third and fourth electrodes spaced about said crystal and extending along said crystal in the direction of propagation of said beam, the surfaces of said electrodes adjacent said crystal being substantially hyperbolic in shape,
   (c) insulating means separating each of said electrodes from each other and from said electro-optic crystal, and
   (d) means for applying a signal voltage between said electrodes, the electric field produced thereby resulting in said linear variation in the refractive index of said crystal in a direction transverse to the direction of propagation of said beam, the beam emerging from said crystal being deflected from said direction of propagation through an angle determined by the change in said refractive index.

6. Apparatus for deflecting a beam of light comprising
   (a) an electro-optic crystal having mutually orthogonal [001], [110] and [1$\bar{1}$0] directions,
   (b) means for producing a linear variation in the refractive index of said crystal comprising first, second, third and fourth electrodes spaced about said crystal and extending along said crystal in a first direction normal to said [001] direction, the surfaces of said electrodes adjacent said crystal being substantially hyperbolic in shape,
   (c) insulating means separating each of said electrodes from each other and from said electro-optic crystal, and
   (d) means for applying a signal voltage between said electrodes, the electric field produced thereby resulting in said linear variation in the refractive index of said crystal in a second direction normal to said first direction, a beam of light propagated through said crystal along said first direction being deflected from said direction of propagation through an angle determined by the change in said refractive index.

7. Apparatus for deflecting a beam of light as defined by claim 6 wherein said beam is propagated along the [1$\bar{1}$0] direction and linear variation in the refractive index of said crystal occurs along the [110] direction.

8. Apparatus for deflecting a beam of light as defined by claim 6 wherein said electro-optic crystal is composed of potassium dihydrogen phosphate and said insulating means is composed of an isotropic dielectric.

9. Apparatus for deflecting a beam of light comprising
   (a) an elongated anisotropic electro-optic crystal having a rectangular cross-section and mutually orthogonal [001], [110] and [1$\bar{1}$0] directions, said [001] direction being parallel to first and second sides of crystal and perpendicular to the upper and lower surfaces thereof,
   (b) first and second isotropic dielectric elements secured to the first and second sides of said crystal respectively,
   (c) third and fourth isotropic dielectric elements secured to the upper and lower surfaces of said crystal respectively and to portions of said first and second dielectric elements,
   (d) first, second, third, and fourth electrodes, said first electrode being affixed to said first and third dielectric elements, said second electrode being affixed to said second and third dielectric elements, said third electrode being affixed to said second and fourth dielectric elements, and said fourth electrode being affixed to said first and fourth dielectric elements, the boundaries between said first and second electrodes and said third dielectric element and between said third and fourth electrodes and said fourth dielectric element being hyperbolic in shape, and (e) means for electrically coupling one terminal of a signal voltage source to said first and third electrodes and the other terminal to said second and fourth electrodes, said beam being deflected through an angle determined by the voltage output of said source.

10. Apparatus for deflecting a beam of light as defined by claim 9 wherein the boundary between said second electrode and said third dielectric element is expressed by the equation $$y = -\frac{h\epsilon_2}{2\epsilon_1} + \frac{X_1}{x}\left(Y_1 + \frac{h\epsilon_2}{2\epsilon_1}\right)$$

where $y$ is the distance between any point on the boundary and a line in the [001] direction through the center of said rectangular crystal, $x$ is the distance between any point on the boundary and the upper surface of said crystal, $X_1$ and $Y_1$ are values of $x$ and $y$ for a selected point on said boundary, $h$ is the length of the side of said crystal, $\epsilon_2$ is the dielectric constant of said dielectric elements and $\epsilon_1$ is the dielectric constant of said crystal along the [001] direction, and wherein said first, third and fourth electrodes have the same curvature as said second electrode.

11. Apparatus for deflecting a plane polarized incident beam of light comprising
  (a) a first deflector including
    (1) a first electro-optic crystal oriented with its [001] direction normal to both the plane of polarization of said incident beam and the direction of propagation of said beam,
    (2) means for producing a linear variation in the refractive index of said crystal in a direction parallel to the plane of polarization of said incident beam comprising a first set of electrodes spaced about said first crystal and extending along said crystal in the direction of propagation of said beam, the surfaces of said electrodes adjacent said crystal being substantially hyperbolic in shape, and
    (3) means for applying a first signal voltage between the electrodes of said first set,
  (b) a second deflector including
    (1) a second electro-optic crystal oriented with its [001] direction parallel to the plane of polarization of said incident beam and normal to the direction of propagation of said beam,
    (2) means for producing a linear variation in the refractive index of said crystal in a direction normal to the plane of polarization of said incident beam and to said direction of propagation comprising a second set of electrodes spaced about said second crystal and extending along said crystal in the direction of propagation of said beam, the surfaces of said electrodes adjacent said crystal being substantially hyperbolic in shape, and
    (3) means for applying a second signal voltage between the electrodes of said second set, and
  (c) a polarization converter interposed between said first and second deflectors, said polarization converter comprising a half-wave plate having its fast direction oriented at 45° degrees to the plane of polarization of said incident beam.

References Cited

UNITED STATES PATENTS 2,836,652  5/1958  Sprague _____ 350—160

JEWELL H. PEDERSEN, *Primary Examiner.*

W. L. SIKES, *Assistant Examiner.*